United States Patent

Binder

[11] 3,908,798
[45] Sept. 30, 1975

[54] PRESSURIZED LUBRICATION CIRCULATION SYSTEM FOR THE MAIN BEARINGS OF AN INTERNAL COMBUSTION ENGINE

[75] Inventor: Robert Binder, Schwieberdingen, Germany

[73] Assignee: Dr. -Ing. H.c.F. Porsche Aktiengesellschaft, Germany

[22] Filed: Nov. 26, 1973

[21] Appl. No.: 418,906

[30] Foreign Application Priority Data
Nov. 24, 1972 Germany............................ 2257651

[52] U.S. Cl.............................. 184/6.5; 123/196 R
[51] Int. Cl.². ........................................... F01M 1/04
[58] Field of Search ... 184/6.5; 123/196 R, 196 OP; 308/23, 179

[56] References Cited
UNITED STATES PATENTS

| | | | |
|---|---|---|---|
| 1,234,878 | 7/1917 | Corvin | 184/6.5 |
| 1,634,123 | 6/1927 | Taub | 184/6.5 |
| 3,089,735 | 5/1963 | Mann | 308/23 |
| 3,613,833 | 10/1971 | Liewellyn | 184/6.5 |

*Primary Examiner*—Richard C. Pinkham
*Assistant Examiner*—Marvin Siskind
*Attorney, Agent, or Firm*—Craig & Antonelli

[57] ABSTRACT

A pressurized lubricant circulation system for the main bearings of an internal combustion engine is provided for an engine of the type having a crankshaft accommodating housing which is split in the plane of the crankshaft axis and consists essentially of a cylinder block and a single-piece bearing block accommodating all of the crankshaft bearings. The cylinder block and bearing block are in contact with each other through broad flange portions forming sealing surfaces. The lubricant circulation system includes a plurality of grooves formed in the face of the bearing block, with the grooves being closed off by the plane sealing surface of the facing cylinder block so that no additional lubricant line means are required. These lubricant circulating grooves include a main line extending along and completely around the plurality of crankshaft bearings and tie lines extending from the main line to communicate lubricant to the individual main bearings. Two tie lines are provided for each main bearing, which communicate with respective opposite lateral sides of the main bearing. A relief groove is also formed in the surface of the bearing block which is positioned outwardly with respect to the main line and tie lines for the lubricant and which includes a drain line communicating with an engine oil sump.

14 Claims, 2 Drawing Figures

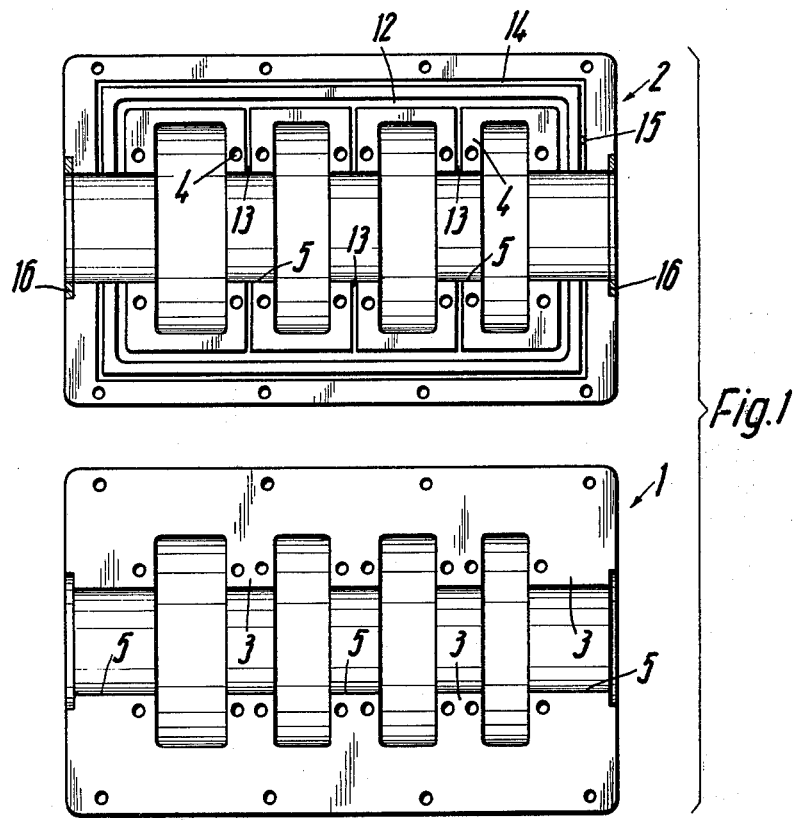
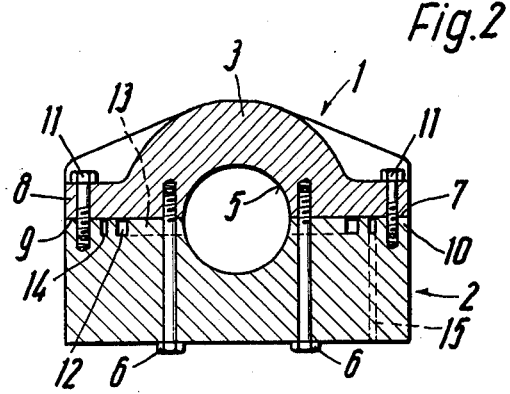

3,908,798

PRESSURIZED LUBRICATION CIRCULATION SYSTEM FOR THE MAIN BEARINGS OF AN INTERNAL COMBUSTION ENGINE

BACKGROUND AND SUMMARY OF THE INVENTION

The present invention relates to a pressurized lubricant circulation system for the main bearings of an internal combustion engine. It is particularly related to an engine of the type having a housing for accommodating the crankshaft which is split in the plane of the crankshaft axis and consists essentially of a cylinder block and a single-piece bearing block accommodating all crankshaft bearings. It is further related to engines of this type wherein the cylinder block and bearing block are in contact with each other through broad flange portions forming sealing surfaces.

In high-speed, high-output internal combustion engines, it is necessary to provide an adequate, precisely controlled, supply of lubricating media to the main bearings so as to assure a reliable support of the crankshaft and long life of the crankshaft and main bearings. At the same time, it is desirable that the lubricant media supply system involve minimal manufacturing costs so that these engines can be mass produced. For example, the mass production of such high performance internal combustion engines is particularly significant for producing high-performance sports cars and the like.

It has been contemplated to construct an internal combustion engine arrangement having a housing, split in the plane of the crankshaft axis and including a cylinder block and a bearing block accommodating all main bearings of the crankshaft with the blocks being connected with each other along said plane by stay bolts. In this type of arrangement, the facing underside of the cylinder block and the upper side of the bearing block include broad flanges which cooperate together to form sealing surfaces to seal the engine housing towards the outside. Such a two-piece arrangement of the engine housing has the advantage that through the combination of all crankshaft main bearings in one bearing block, an optimal support of the crankshaft is assured. (The Autocar, Dec. 4, 1964, pages 1160 and 1161).

In the type of engine discussed herein, it is important and essential that an adequate supply of lubricating media under pressure is supplied to the crankshaft main bearings. This lubricant supply is important in addition to careful construction and arrangement of the main bearings so as to avoid that a tilted position of the crankshaft pin inside of the bearing or a bending of the crankshaft pin results in edge pressure which may cut off the lubricating media cushion in the bearing. With internal combustion engines having pressurized lubricant circulation systems, lubricating media under pressure is continuously fed into the bearing gap between the crankpin and bearing shell or sleeve. For high-output internal combustion engines, a pressurized lubricant supply system has been contemplated which includes a central main line supplied by the lubricating pump and a tie line interconnecting the main line with each individual crankshaft main bearing. This known lubricant supply arrangement for the crankshaft main bearings is, however, very expensive to manufacture since pressure bores forming a conduit path must be provided in the housing of the engine. Also, individual conduit paths for the main and tie lines must be built into the engine housing, with the further requirements for sealing provisions of the connecting points of the conduit paths among themselves and to the engine housing.

During operation of an engine, one-sided directed shock loadings are applied to the crankshaft main bearings which effect an eccentric position of the crankpin in the bearing bore. This eccentric positioning of the crankpin in conjunction with the relative rotative motion between the crankpin and the bearing shell, create the formation of a lubricant wedge between the crankpin outer surface and the bearing shell. That is, since the crankshaft is forced eccentrically by the one-sided shock loadings, the space between the outer surface of the crankpin and the inner surface of the bearing shell varies continuously over the circumference of the bearing shell during rotation of the crankpin with the smallest lubricant media gap (gap between the crankpin and bearing shell) cross-section lying in the direction of rotation of the crankshaft behind the line of application of the one-sided directed shock loading forces. This lubricant media gap exhibits a continuously increasing cross-section from the position of the smallest cross-section so that upon turning of the crankshaft pin, a vacuum or under pressure is created in the gap between the crankshaft and the bearing shell surface. That is, the relative motion of the crankshaft and bearing surface, in conjunction with the increase in width of the gap results in a vacuum generation within the enlarged portion of the gap which effects the sucking of air from the sides of the bearing so that the lubricant in the bearing is interspersed with gas (air). This interspersion of gas in the lubricant media disadvantageously reduces the carrying capacity of the lubricant media with consequent potential damages to the bearings. In arrangements wherein the lubricant supply lines are arranged in the extension of the cylinder axes, even with the supply of lubricant under pressure, the formation of under pressure or vacuum zones in the area of the expanding lubricant wedge cannot be avoided.

In order to avoid the above-discussed disadvantages of the prior art arrangements, the present invention contemplates providing a pressurized lubricant circulation system which assures an optimal supply of lubricant media to the main bearings and which can be manufactured at minimal cost. More particularly, the present invention contemplates an improved lubricant circulation system for an internal combustion engine of the above-described type which includes a multi-part housing for the main bearings, wherein, in the separating plane of the separate housing portions, that is, between the cylinder block and the bearing block, a common lubricant supply system for all crankshaft bearings is arranged which consists of a circulating main line and tie lines which branch off from it in pairs and lead to the individual crankshaft main bearings at opposite lateral sides thereof. That is, the main line extends around the plurality of crankshaft main bearings and includes respective portions at opposite lateral sides of the main bearings, with two tie lines for each main bearing which open into the lubricant gap at the main bearing in opposing facing relation at respective opposite lateral sides of the main bearing.

The present invention further contemplates forming the circulating main line and the tie lines of the lubricant supply system as groove-like recesses in the sealing surface of the flange of one of the two engine housing portions. In preferred embodiments, the grooves for the lubricant supply lines are formed in the sealing surface of the bearing block and are sealed off by the plane sealing surface of the flange of the other housing portion, namely the cylinder block. According to a further feature of the invention, in order to assure an entirely satisfactory sealing of the separating surface which accommodates the lubricating media suply system, a relief groove is arranged in the flange of one of the housing portions at a distance in the outward direction toward the outer surface of the housing with respect to the circulating main line of the lubricant supply system. This relief groove is communicated by a conduit path with the oil sump of the engine. The circulating main line of the supply system is supplied by a pressure pump with a lubricant under pressure so as to provide a uniform lubricant supply to all crankshaft main bearings.

The above-described arrangement of the lubricant supply system in the separating plane of the two engine housing portions greatly simplifies the manufacturing process and thereby reduces the manufacturing costs. Since the lubricant supply is by way of the grooves formed in one of the surfaces at the separating plane of the two housing portions, these lines can be cast in the form of simple grooves in the flange of one of the housing portions. Since the groove-like recesses are provided in preferred embodiments in the flange of one one engine housing portion with the flange of the other engine housing portion consisting of a plane sealing surface, relatively large tolerance limits are permissible for the pattern of the groove-like recesses. That is, as long as the respective flange sealing surfaces of the housing portions are configured so as to accommodate sealing engagement therebetween, a requirement necessary in any event for this type of two-part housing, the particular dimensions of the grooves in the one housing portion need not be closely dimensioned in order to assure a sealed, reliable lubricant supply path. Further, since the lubricant supply within the engine housing is by way of the simple groove construction, it is not necessary to consider the assembly and sealing of a separate lubricant supply line system within the housing during the assembly of the engine.

A further advantage of the arrangement of the present invention results from the fact that the recesses or grooves are open in the outward direction in the flange of one of the housing portions so that they are readily accessible for further machining in case such is necessary.

A further advantage of the arrangement of the present invention relates to the symmetric arrangement of the two tie lines leading to each of the main bearings of the crankshaft. By extending these tie lines in an essentially horizontal arrangement in the plane of the axis of the crankshaft, the lubricant is fed under pressure to each crankshaft main bearing at a small distance from the point of the smallest cross-section of the lubricant wedge so that an under pressure between the crankshaft pin and the bearing shell is avoided.

A further advantageous feature of the present invention relates to the use of the simply constructed relief groove in the flange of one of the engine housing portions, and which surrounds the entire lubricant supply system within the engine housing. This relief groove assures a safe sealing of the engine housing, and especially of the lubricant supply system, in the simplest manner without requiring additional sealing parts.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 is an exploded schematic view which illustrates the configuration of the respective facing surfaces of a cylinder block and a bearing block for an internal combustion engine constructed in accordance with the present invention; and FIG. 2 is a sectional schematic view taken along a plane perpendicular to the view of FIG. 1 and showing the cylinder block and bearing block of FIG. 1 in an assembled condition.

DETAILED DESCRIPTION OF THE DRAWINGS

The housing of an internal combustion engine consists essentially of a cylinder block 1 and a bearing block 2. The bearing block 2 includes yokes 4 and the cylinder block 1 includes transverse walls 3, which yokes 4 and transverse walls 3 respectively accommodate one-half of a split crankshaft main bearing.

Cylinder block 1 is connected to the bearing block 2 in the area of the yokes 4 by means of stay bolt pairs 6 (see FIG.2 for the assembled cylinder block 1 and bearing block 2, wherein the bolts 6 extend through the bearing block 2 and engage in the holes of the cylinder block 1, it being noted that the holes for bolts 6 in the bearing block and in the cylinder block are schematically depicted in the FIG. 1 illustration).

At the lower end of the cylinder block 1, a flange 8 is provided which exhibits a downwardly facing plane sealing surface 7. In a similar manner, the bearing block 2 is provided on the side facing the cylinder block 1 with a flange 10 which exhibits a plane sealing surface 9. Screw bolts 11 are provided around the entire engine housing circumference for additionally clamping the cylinder block 1 and bearing block 2 together. The clamping action of screw bolts 11 assures an exact and uniform mutual contact of the sealing surfaces 7 and 9 of the flanges 8 and 10 throughout the entire engine housing circumference.

In the sealing surface 9 of flange 10 of the bearing block 2, lubricant lines or guide paths are formed as groove-like recesses 12 and 13. The recess 12 extends throughout the entire machine housing circumference as a circulating main line which is spaced a distance from the respective crankshaft main bearings 5. The groove-like recesses 13 constitute tie lines communicating the recess 12 with respective main bearings 5. These recesses 13 are arranged in pairs at respective opposite sides of the housing so that they open to respective opposite lateral sides of each of the crankshaft main bearings 5.

The machine housing accommodating the main bearings, and especially, the lubricant supply system 12, 13, is sealed toward the outside by the plane contacting sealing surfaces 7 and 9 of the flanges 8 and 10 of the cylinder and bearing blocks 1 and 2. Relief groove 14 which is arranged in a sealing surface 9 of flange 10 and which extends outwardly spaced from the recess 12 around the circumference of the housing parts provides a further significant assurance against leakage to the outside of the housing parts. This groove 14 is connected by means of a conduit path 15 with the oil sump (not illustrated) of the internal combustion engine.

The crankshaft of the engine, which is not shown in the drawings of known construction and so as to better facilitate the illustration of the novel lubricant supply system, is sealed off on both ends thereof by way of seal rings 16 interposed against the engine housing parts 1 and 2.

During the manufacture of the engine, the bearing block 2 and cylinder block 1 are produced independently from each other preferably by a casting method. In the sealing surface 9 of flange 10 of the bearing block 2, the groove-like recesses 12, 13, 14 are formed during the casting operation. As described above, these grooves, together with the oppositely facing planar surface of the cylinder block 1, form the lubricant supply main line 12, tie lines 13, and relief groove 14.

During operation of the engine with the novel lubricant circulation system of the present invention, the following takes place. In operation, the crankpin of the crankshaft assumes an eccentric position in the bearing bore of the crankshaft main bearing due to the one-sided directed shock forces. This eccentric positioning in combination with the relative rotating motion between the crankpin and the bearing surfaces results in the formation of a lubricant wedge with the smallest lubricant gap cross-section between the crankpin and bearing sleeve being displaced in the direction of rotation of the crankpin in relation to the direction of the shock load. This gap widens in the direction of rotation of the crankpin so that under pressure or vacuum zones are created between the crankpin and the bearing surface. With the arrangement of the two oppositely facing tie lines 13 opening at respective opposite lateral sides of the main bearing 5, lubricant under pressure is fed to the main bearing at a relatively small distance with respect to the smallest gap cross-section. Because the lubricant is applied under pressure at a position close to the smallest gap cross-section, the effects of the created vacuum or under pressure is immediately and continuously accommodated for by the supply of lubricant under pressure such that the undesirable sucking in of air is substantially prevented. On the other hand, the oppositely located tie line 13 opens into the beginning or starting area of the lubricant wedge formation in the respective main bearing 5 so as to deliver a quantity of lubricant into the bearing sufficient for the formation of a lubricant wedge sufficient to support the experienced load.

The supply of pressurized lubricant to the groove 12 can be by means of a conventional pump and lines leading through cylinder block 1 or bearing block 2 from the outside of the engine housing to the groove 12. Such pump and lines have not been included in the illustration so as not to obscure the illustration of the present invention.

While I have shown and described one embodiment in accordance with the present invention, it is understood that the same is not limited thereto but is susceptible of numerous changes and modifications as knwon to those skilled in the art and I therefore do not wish to be limited to the details shown and described herein but intend to cover all such changes and modifications as are encompassed by the scope of the appended claims.

It will be understood that separate supply and return lines are provided from the pump to groove 12 at each of the two opposite lateral sides of the engine housing.

I claim:

1. A lubricant supply system for the main bearings of an internal combustion engine of the type having a plurality of main bearings and a two-part engine housing for accommodating said main bearings, the two parts of the engine housing being joined together along a separation plane at flanges exhibiting sealing surfaces; said system comprising:

a main lubricant circulating line, a pair of lubricant tie lines for each main bearing which extend from said main line to each of said main bearings with the tie lines of a pair opening to a respective main bearing at respective diametrically opposite lateral sides of said respective main bearing, wherein each of the main line and the tie lines are formed by groove-like recesses opening to the sealing surface of one of said engine parts, said recesses being sealed off by the sealing surface of the other of said engine parts in the assembled condition of the engine parts, and a relief groove in one of said engine parts, said relief groove extending around the main line at a spacing toward the outside of the engine housing for collecting any lubricant that may leak outwardly of said main line between said sealing surfaces of said flanges.

2. A system according to claim 1, wherein said one of said engine parts is a bearing block and the other of said engine parts is a cylinder block.

3. A system according to claim 2, wherein said cylinder block is positioned above said bearing block.

4. A system according to claim 3, wherein said separating plane extends through an axis of rotation of a crankshaft supported in said main bearings.

5. A system according to claim 1, wherein said relief groove is formed in said one of said engine parts which also includes the recesses forming said main line and tie lines.

6. A system according to claim 5, wherein said recesses and said groove are formed in a bearing block which constitutes one of said engine parts, the other of said engine parts being a cylinder block.

7. A system according to claim 6, wherein said cylinder block is positioned above said bearing block.

8. A system according to claim 7, wherein said separating plane extends through an axis of rotation of a crankshaft supported in said main bearings.

9. A system according to claim 8, further comprising lubricant supply means for continuously supplying lubricant under pressure to said main line and tie lines during operation of an engine formed with said two engine parts.

10. A system according to claim 1, further comprising lubricant supply means for continuously supplying lubricant under pressure to said main line and tie lines during operation of an engine formed with said two engine parts.

11. A system according to claim 1, wherein said separating plane extends perpendicular to the direction of movement of cylinders within one of said engine parts, and wherein said tie lines extend to their respective openings to the main bearings along said separating plane.

12. A system according to claim 11, wherein said separating plane extends horizontally through the axis of rotation of a crankshaft supported in said main bearings.

13. A system according to claim 1, wherein said two engine parts consist of a cylinder block and a bearing block which together accommodate all engine crankshaft main bearings.

14. A system according to claim 1, wherein a conduit path is provided for communicating said relief groove to an oil sump of said engine.

* * * * *